United States Patent [19]

Bakun et al.

[11] 4,037,583
[45] July 26, 1977

[54] SOLAR HEATING SYSTEM AND PANELS

[76] Inventors: Paul Bakun, 14 Terrace Court, Old Westbury, N.Y. 11568; Clifford Porter, 13 St. Eleanora's Lane, Crestwood, N.Y. 10707

[21] Appl. No.: 597,541

[22] Filed: July 21, 1975

[51] Int. Cl.$^2$ .............................................. F24J 3/02
[52] U.S. Cl. .................................... 126/271; 126/400; 237/1 A
[58] Field of Search ...................... 126/270, 271, 400; 237/1 A

[56] References Cited

U.S. PATENT DOCUMENTS

| | | | |
|---|---|---|---|
| 2,998,006 | 8/1961 | Johnston | 126/271 |
| 3,190,816 | 6/1965 | Adamec | 126/271 X |
| 3,236,294 | 2/1966 | Thomason | 126/400 |
| 3,239,000 | 3/1966 | Meagher | 126/271 |
| 3,262,493 | 7/1966 | Hervey | 126/271 |
| 3,369,541 | 2/1968 | Thomason | 126/400 |
| 3,812,903 | 5/1974 | Thomason | 126/400 |
| 3,815,574 | 6/1974 | Gaydos, Jr. | 126/271 |
| 3,889,742 | 6/1975 | Rush et al. | 126/271 X |
| 3,893,506 | 7/1975 | Laing | 126/271 |

*Primary Examiner*—Kenneth W. Sprague
*Attorney, Agent, or Firm*—Roberts & Cohen

[57] ABSTRACT

A solar heating system is provided in which is employed a source of a heatable fluid and an arrangement of solar heating panels to receive heat from the sun and heat the fluid therewith. A heat sink is provided to receive the fluid from the solar panels and to store heat received with the fluid. A heat transfer arrangement transfers heat from the heat sink to a heating system medium. The heat sink includes a tank which is connected in a closed loop with the solar heating panels to receive heatablefluid from the panels. Aggregate is provided in the tank to store heat received via the heatable fluid. The heat transfer arrangement includes a duct for the passage of air and rocks arranged in the duct for storing heat received from the tank. In one construction, the panels each comprise an array of tubes of a heat conductive material and a heatable mass in which the array is located and heated in order to heat fluid flowing through the tubes. The heatable mass may include a dark colored concrete in which are embedded sheets of screening which sandwich the tubes therebetween. Another construction includes spaced corrugated metal sheets which form an envelope which is fed by tubes attached to the top and which drain at the base. The envelope may also be made up of flattened tubes which would compartmentalize each corrugation.

11 Claims, 6 Drawing Figures

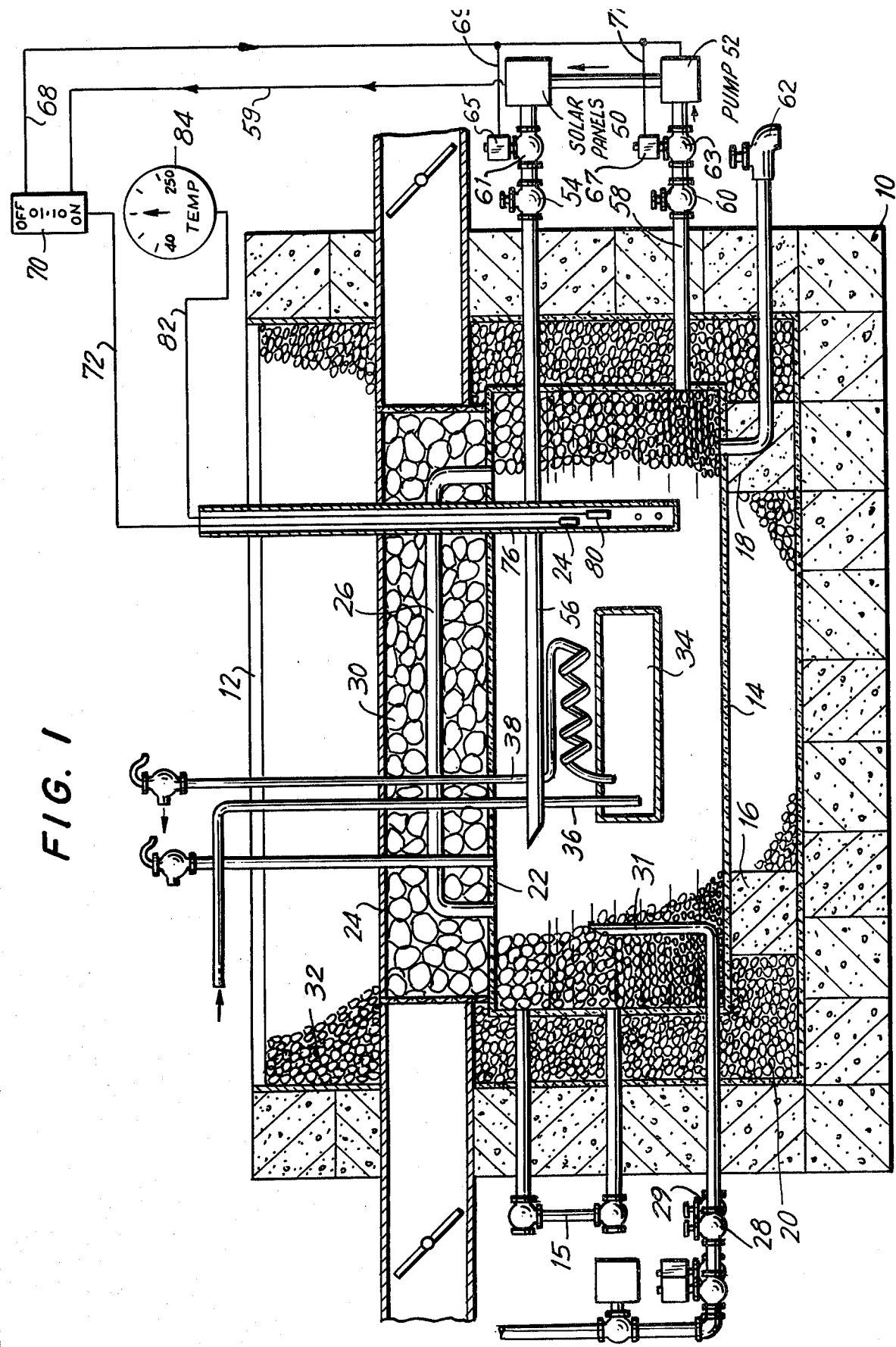

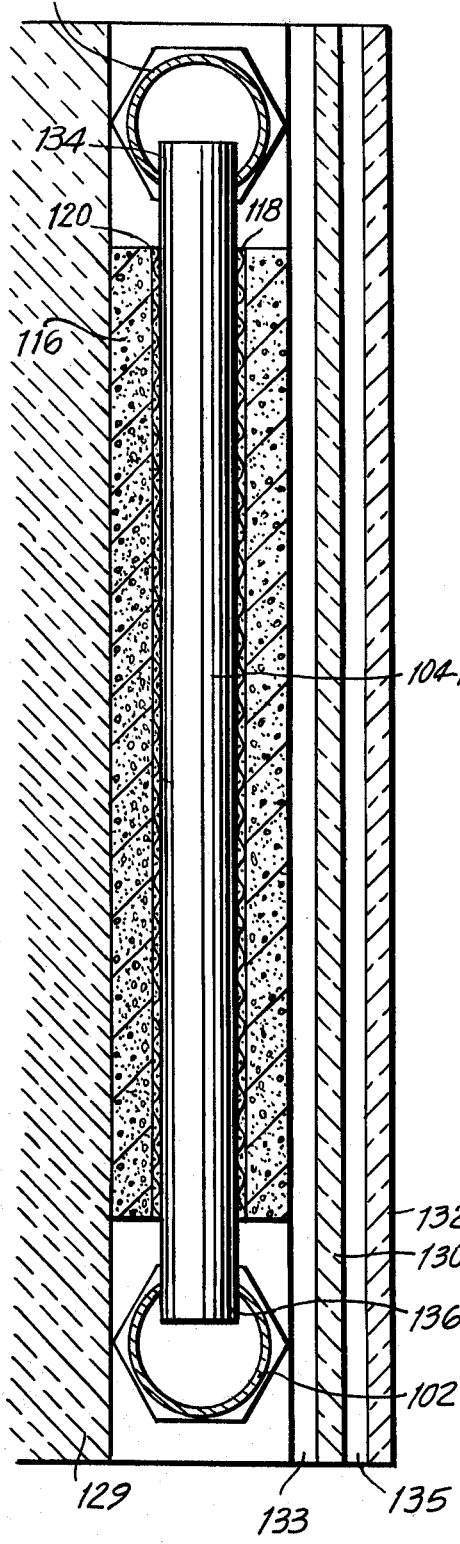
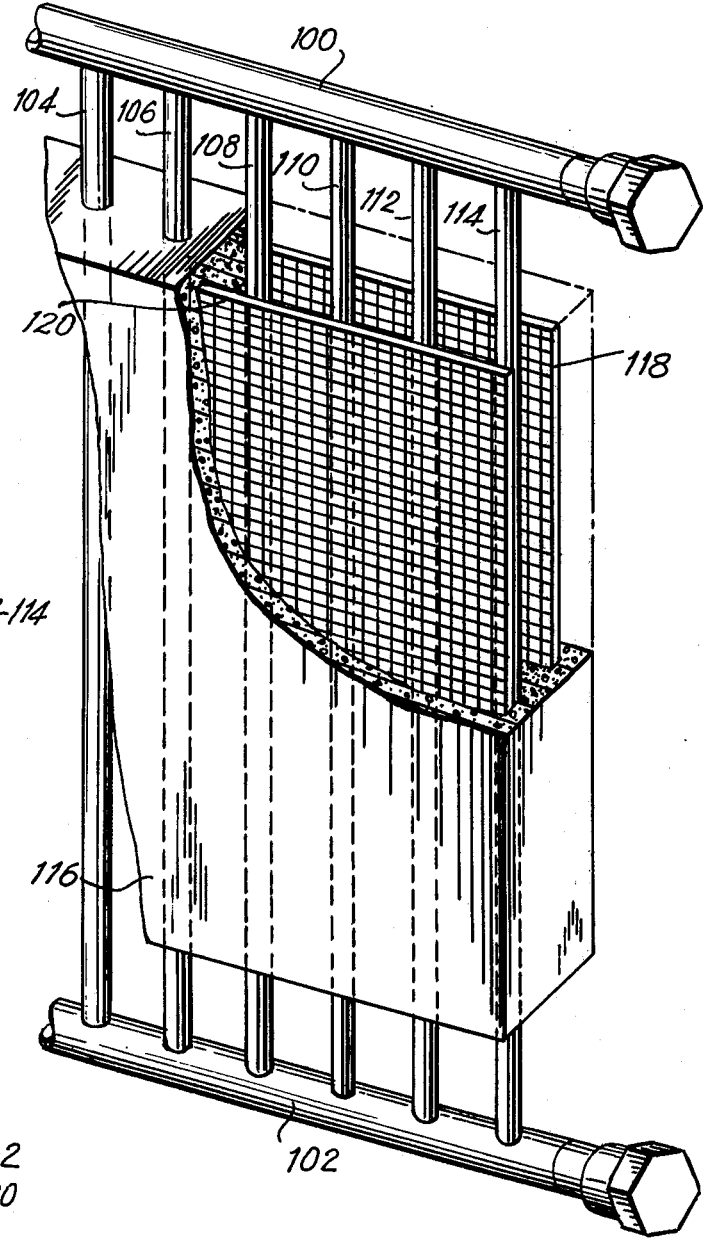

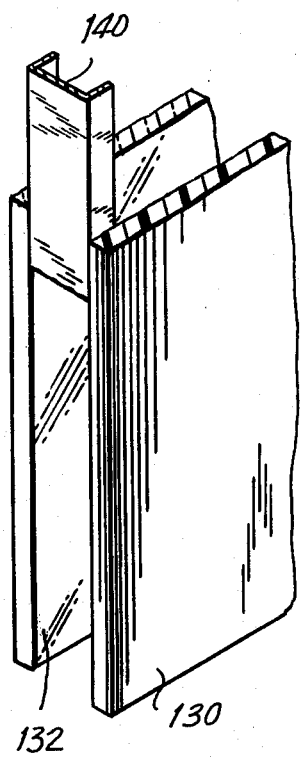
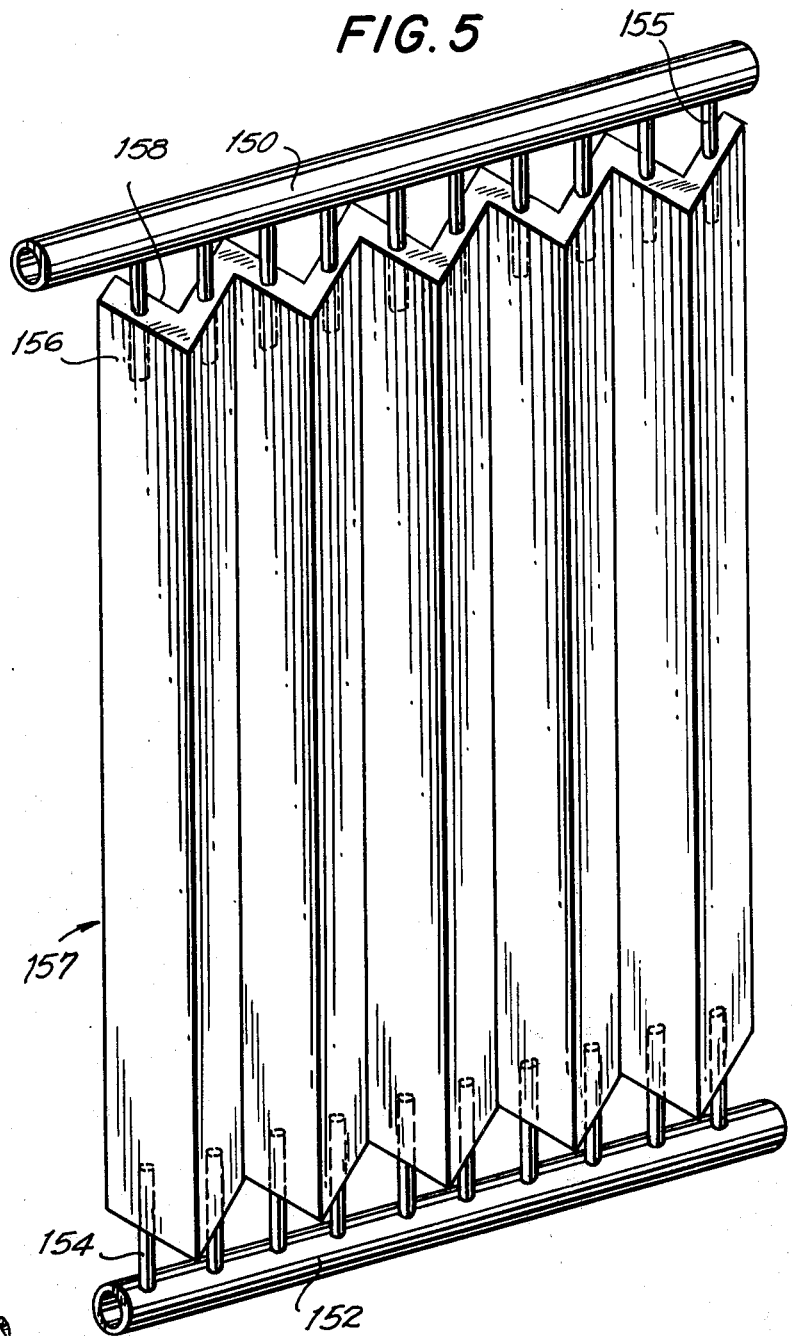
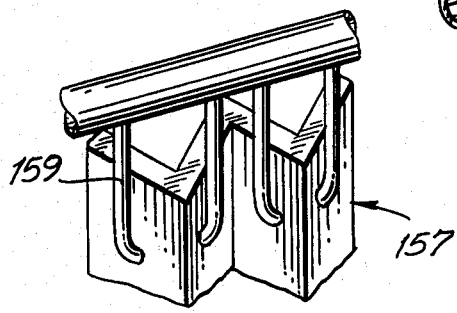
FIG. 4
FIG. 5
FIG. 6

SOLAR HEATING SYSTEM AND PANELS

FIELD OF INVENTION

This invention relates to solar heating systems and to solar heating panels for use therein.

BACKGROUND

In reviewing the prior art preparatory to determining the novelty of our invention we have come across a number of prior art patents relating to solar heaters and the like. Some of these prior patents use elements which we employ in accordance with our invention. However, the prior art patents utilize these common elements in a different way and do not succeed achieving the advantageous and efficient recovery of heat which we achieve when practicing our invention.

Although we mention some of these prior art patents hereinafter, we do not feel that these prior art patents in any way relate to our invention and a discussion of the features which follows hereinafter is intended only to provide a brief acknowledgement of some of the techniques which have been heretofore employed.

For example, H. E. Thomason in U.S. Pat. No. 3,369,539 of Feb. 20, 1968 reveals a system in which solar rays enter a solar heat trap or collector through a substantially transparent cover arrangement, the rays striking a heat collecting layer of bits of material such as sand or blue stone chips, with or without an asphalt, coal tar or similar blackening binder. The granular material was found to have a tendency to slide or creep or flow towards the bottom of the collector. This problem was overcome by using mesh to prevent sliding or creeping. Water is flowed through the trap to remove heat and it is stated that if the mesh is wire or other heat conducting material, it aids in transfering heat to the water from the heat collecting material.

T. B. Modine in U.S. Pat. No. 2,274,492 reveals a heating device with a substantially flat heat transfer element comprising a pair of substantially parallel inlet and outlet pipes and a plurality of smaller cross-tubes connecting these pipes for the passage of fluid to be heated from the inlet pipe to the outlet pipe. In this arrangement a plurality of fins extend between and are rigidly secured to the cross-tubes. These fins are substantially parallel with the common axial plane of the pipes. A container is provided which encloses the aforesaid element consisting of a bottom, a glass top and side and end members. A layer of heat insulating material is positioned between the heat transfer element and the above-noted bottom.

O. H. Mohr in U.S. Pat. No. 2,122,821 has as an object the improving and simplifying of the construction and operation of solar heaters. A heater is provided which consists of a series of spaced upwardly inclined tubes connected at their upper and lower ends by headers, the tubes and headers being made of a metal such as copper or the like having a high coefficient of heat conductivity and being painted or colored black to absorb the greatest amount of heat possible when exposed to radiation. Mohr provides a housing or box for the receiving and support of the heating tubes and headers, the box being insulated to retain heat and being covered with two or more layers of glass with an intermediate dead air space to reduce conduction losses to a minimum. There is further provided an arrangement of tubes and heaters which not only function as a solar heater but also as a hot-water storage reservoir. An auxiliary heater is employed for heating and circulating water in the solar heater when necessary. A winding is provided within the housing whereby both direct and reflected radiant energy is utilized in between the tubes and headers.

According to U.S. Pat. No. 2,208,789, B. H. Cally provides for a construction of a solar heating unit in such a manner that smaller heating tubes are used than were previously employed and novelty is provided in joining the tubes with header pipes of a larger diameter in such a manner that the speed of circulation may be any predetermined speed deemed necessary for proper heating of the water.

According to U.S. Pat. No. 3,514,942, W. F. Kyryluk provides a solar heater transducer including a transducer element having an outer member of a material transparent to solar radiant energy rays in combination with an enclosure with a space defined in between an inner side of the transducer and a wall of the enclosure, with a fluid heated by the transducer positioned in the enclosure.

G. Meckler in U.S. Pat. No. 3,369,540 bases his invention upon the discovery of apparatus for preventing or minimizing the thermal load normally imposed on the air conditioning system of a building due to external natural light sources. In accordance with his invention, Meckler provides a multisheet light transmitting structure which is capable of absorbing a substantial amount of solar energy which it would otherwise pass therethrough and which is capable of dissipating this energy while minimizing the increased heat load in the building.

F. M. Kiser in U.S. Pat. No. 2,167,576 provides a cover or hood formed of a material adapted to concentrate the sun's rays upon a water heating tank. The size and shape of the hood is determined by the hot water requirements and the hood preferably comprises upwardly inclined glass side walls, glass end walls and a glass top wall, the walls being connected together and reinforced at their intersections by angle iron strips.

While the above patents refer generally to solar heating and solar heating systems and panels and while these patents furthermore use individual features which we also employ in the present invention, they do not achieve the effectiveness of solar heat recovery which is achieved in accordance with the instant invention and consequently are not anticipatory thereof.

SUMMARY OF INVENTION

It is an object of the invention to provide an improved solar heating system and improved solar heating panels therefor.

It is a further object of the invention to provide an improved technique for the recovery of solar heat.

It is another object of the invention to provide an improved solar heating system in which the heat is retained and distributed in a novel fashion.

In achieving the above and other objects of the invention, there is provided a solar heating apparatus comprising a source of a heatable fluid, solar heating means to receive heat from the sun and heat said fluid therewith, heat sink means to receive the fluid from the solar heating means and to store heat received with said fluid and heat transfer means to transfer heat from said heat sink to a heating medium.

In further accordance with the invention, the heat solar heating panel employed may comprise an array of tubes of a heat conductive material which is substantially inert to the aforesaid fluid. A heatable mass is employed in which said array is located and in which the array is heated to heat fluid flowing through the tubes. The heatable mass may include a dark colored concrete and sheets of screening embedded in the concrete with said array, said sheets sandwiching said tubes therebetween. The tubes may alternatively be arranged in parallel and connected to an envelope formed of corrugated metal sheets. The dark colored concrete employed in one of the aforesaid panel arrangements may be a mixture of concrete and carbon black or iron oxide.

In accordance with a feature of the invention the heat sink may include a tank and means to connect the tank in a closed loop with the solar heating means to receive the heatable fluid from the latter, said tank transferring heat to said heat transfer means, there being provided aggregate in said tank to store heat received via said heatable fluid.

According to still another feature of the invention, the heat transfer means may include a duct for the passage of air with rocks being provided in the duct for storing heat received from the tank.

According to still another feature of the invention, the aforesaid tank may be externally surrounded by further light weight aggregate and a concrete bin may be provided in which this tank and further aggregate are stored or located.

In still further accordance with the invention, there may be provided a hot water storage tank located in the first said tank. Moreover, there may be provided thermostat pickup means in the first said tank and thermostat means coupled to said pickup means, said source of heatable fluid including a pump controlled by said thermostat means to drive said fluid through said closed loop.

According to a particularly novel feature of the invention, the aggregate may be of generally increasing size from the bottom to the top of the first said tank, said aggregate being oversized gravel about one and one-half to three inches.

According to still another feature of the invention, each said solar panel may include a header and return tubing between which the aforesaid tubes extend, said tubes extending into the header and return tubing to constitute a solids trap therewith.

The above and further objects, features and advantages of the invention will be found in the detailed description which follows hereinafter.

BRIEF DESCRIPTION OF DRAWING

In the drawing:

FIG. 1 is a partly sectional view through a solar heat recovery and storage system provided in accordance with the invention;

FIG. 2 is a sectional perspective view illustrating a solar panel in accordance with an embodiment of the invention;

FIG. 3 is a sectional view through the solar panel of FIG. 2;

FIG. 4 illustrates a shield arrangement for the solar panel arrangement of FIGS. 2 and 3 and for other solar panel arrangements of the invention;

FIG. 5 is a perspective view of a further solar panel in accordance with another embodiment of the invention; and FIG. 6 is a modification of the panel of FIG. 5.

DETAILED DESCRIPTION

In accordance with the invention and to retain heat within a storage tank, use is made of stone or aggregate which has lower conductivity and is more retentive than water or other such similar transfer or heatable liquid or fluid which may be employed. Accordingly, the system of the invention has a longer heat retention capacity than would be available should this feature of the invention not be employed.

Generally there is employed a metal tank which is filled with a medium size aggregate or stone. Heated water circulates around the stones gradually increasing the temperature thereof. The use of such stone or aggregate will furthermore reduce the quantity of water or other such fluid required in the tank. This will also reduce the amount of non-toxic antifreeze or other such additives which may be required to prevent freeze-ups during an extended off period at night or on sunless days particularly during frigid periods.

As will be shown, master valves are employed to shut off the lines at the tank. Additional electrically controlled valves prevent a convective flow of hot water to the solar heating panels which may be cooler during off periods. The tank which will be described below may be coated on the outside with tar or a pliable insulating substance which may also be employed to seal off the inside walls of the tank enclosure or bin.

As will be shown, condenser pipes are attached to the top of the tank to be surrounded by larger stones enclosed in a duct housing. This forms a heat tunnel for air circulating through the duct into a heating system inclusive of a trunk duct and branch ducts of, for example, a hot air heating system.

In addition to the hot air duct placed at the top of the solar tank, a fluid circulating system is connected to the existing hot water system. A discharge line at the base of the tank is connected to a riser within the solar tank. This will draw the warm water from the upper part of the tank. The water is returned through a line attached to the base of the tank where the water is cooler.

The duct housing mentioned above may be covered with a light aggregate and a layer of gravel to increase the retention and insulating quality of the system.

The storage tank which is discussed below may be filled to approximately 85% of capacity with a liquid which allows for expansion within the tank. The tank may be protected by a temperature and/or pressure relief valve and should be provided with a slight glass.

In addition, a small domestic hot-water tank is enclosed within the larger storage tank and both may be surrounded by aggregate or oversized gravel located in the bin or first said tank. The hot water tank may be attached to a fresh water supply and a thermostat may be employed to control an electrically operated solenoid valve directing water to the small tank.

In FIG. 1 is illustrated a concrete or cinder block bin 10 optionally provided with a cover 12 thereupon. Within the bin 10 is located the solar storage tank 14 which is provided with a glass sight 15 and is supported on a plurality of blocks such as indicated at 16 and 18. The storage tank 14 may be of metal and may be externally coated with tar or the like. It is surrounded by a volume of aggregate such as indicated at 20. This aggregate may be a commercially available light aggregate which is kiln-heated expanded shale provided with dead air cells, the shale having an external dimension of about three-quarters to 1 and ¼ inches.

Within the storage tank 14, the aggregate increases in size from the bottom to the top of the tank. The aggregate in this case is about 1 to ½ to 3 inches and preferably consists of oversized gravel. This gravel or aggregate has a substantially greater heat retention than water.

Located above the tank 14 and more particularly on top portion 22 of said tank is a duct 24. This duct may be connected with the trunk or branch ducts of a hot air heating system.

The tank 14 communicates upwardly into the duct 24 by means of tubes 26 which are shown by way of illustration only. A number of tubes arranged in parallel may be employed. The tubes may be omitted if desired, the communication between the tank and duct 24 then taking place simply through openings provided for this purpose.

Within the duct 24 is located a volume of rocks 30. These rocks are preferably larger than the aggregate within the tank 14. The purpose of the rocks 30 is to retain the heat released from the tank 14 via tubes 26 and to heat air passing through the duct 24 which is then employed as a heating medium in a hot air heating system.

In addition to the hot air duct placed at the top of the solar tank, a fluid concentrating system is connected to the existing hot water system. A discharge line 28 at the base of the tank is connected to a riser 31 within the solar tank. This will draw the warm water from the upper part of the tank. The water is returned through a line 29 (generally obscured behind line 28) attached to the base of the tank where the water is cooler.

In addition to the aggregate and rocks employed in the aforesaid arrangement, the duct 24 is moreover surrounded by a volume of further aggregate indicated at 32 and serving to provide essentially dead air spaces around the duct 24 to prevent an undesirable cooling of the latter.

The invention provides also for a hot water source which is shown in the form of a hot water supply tank 34 which is connected to provide hot water via a tube 38 and which receives water via tube 36. The purpose of tank 34 is to heat fluid (e.g. water) with heat which is stored within the tank 14 and which is heated by solar panels as will be indicated hereinafter. This heated fluid can further be supplemented by a conventional hot water source (not shown).

The solar heating panels employed in the system illustrated in FIG. 1 are generally indicated at 50. Also indicated in association with the solar panels is a pump indicated at 52. The pump 52 is a source of heatable fluid which is driven through the solar heating panels at a controlled rate. The heating fluid proceeds from the solar panels via a manually and/or electrically controlled valve 54 and via tube 56 into the tank 14. Water or other suitable heatable fluid is returned to the pump 52 via a tube 58 and a manually controlled valve 60 constituting with the pump and solar panels as well as the tank 14 a closed loop. Provision is made for draining the tank 14 such as for purposes of flushing the same via a manually controlled tap 62.

It will be noted that the pump 52 has connected thereto an electrical control line 68. The line 68 is connected to a thermostat 70 which is in turn connected via capillary line 72 to a pickup device 24. The pickup device 24 is located within a tube 76 extending downwardly into the tank 14 and provided with perforations at the lower end thereof whereby to admit heated fluid while keeping out the surrounding aggregate. Also located in the tube 76 is a temperature pickup device 80 connected via a capilliary line 82 to an external thermometer indicated at 84.

In the aforesaid arrangement, the thermostat 70 may be functionally connected in series via line 59 with a second thermostat (not shown) in solar panels 50. The operation of two such thermostats in conjunction with one another will prevent the passing of fluid from the solar panels to the tank 14 and vice-versa under undesirable circumstances such as when fluid in the solar panels 50 will be too cool to admit into the tank 14 since this would only result in a cooling of the tank 14 or when the temperature of the fluid within the tank 14 is in excess of that in the solar panels 50 which would result in an undesirable transfer of heat from the tank 14 to the solar panels 50.

Also shown in FIG. 1 are valves 61 and 63 having solenoid controls 65 and 67 connected via lines 69 and 71 to control line 68. This provides for automatic control of circulation by operation of thermostat 70.

FIG. 2 illustrates one form of solar panel, the use of which is contemplated in accordance with the invention. Herein appear a header tube 100 and a return tube 102 between which extend a plurality of copper tubes such as indicated at 104, 106, 108, 110, 112 and 114. The tubes 104–114 are illustrative of a plurality of coplanar tubes connecting the header and return tubes 100 and 102 for purposes of the circulation of a heatable fluid through a heatable mass such as indicated in the form of a concrete block 116.

The tubes 104–114 are embedded in the concrete block 116, but therein are sandwiched between two sheets of copper screening indicated at 118 and 120. The use of the parallel sheets 118 and 120 of copper screening renders substantially more effective the transfer of heat to the heatable fluid passing through the aforesaid network of riser tubes.

FIG. 3 illustrates the aforesaid arrangement of tubes and concrete. In FIG. 3 can be seen the concrete mass 116 in which are embedded the sheets of copper screening 118 and 120 with the various tubes 104–114 passing therebetween and extending upwardly into the header tube 100 and downwardly into the return tube 102. Insulation 129 is located on the left side of block 116. Also seen in FIG. 3 are the glass or plastic shields 130 and 132 which are spaced from each other in a manner which will be described more fully hereinbelow. They are also spaced from block 116 as indicated at 133.

The shields which are made of either glass or plastic are generally mounted above the panel (i.e., to the right in FIG. 3) and cover the enclosure (not shown) which houses the panel. The space 135 between the double glass or plastic is a dead air space which acts as an insulator. The space between the glass shields and panel is a heat trap to help retain the heat absorbed by the panel. The insulation 129 in the enclosure is placed directly behind (i.e., to the left in FIG. 3) the concrete absorber panel.

In FIG. 3, it is seen that the riser tubes extend upwardly into the header tube 100 such as indicated at 134 and downwardly into return tube 102 such as indicated at 136. The purpose of extending the riser tubes into the header and return tubes is that this inward extension into the header and return tubes constitutes a solids trap whereby accumulations of solids in the heatable fluid are prevented from flowing through the riser tubes.

The dark concrete employed in accordance with the invention is preferably a black concrete mix formed by the addition of carbon black or iron oxide. The black concrete mix heats at a slower rate than metal and is primed by the early morning sun in normal use. As the position of the sun peaks, the panel heats more rapidly transferring its heat to the highly conductive copper screening and copper tubing to heat the transmission liquid being circulated through each panel. In accordance with the invention, a relatively small diameter copper tubing is employed and more parallel sections are preferred so that the amount of heat absorbed by the liquid is increased. The panel is, as has been noted above, formed by sandwiching the tube between two sections of copper screening embedded in a concrete slab. For smaller panels, one section of copper screening can be laced between the tubes because the size does not require as much thermal reinforcement.

The concrete panel of the invention preferably has a roughened surface which will reduce reflection and increase the absorbent surface available. Heat is transferred into the circulating fluid through the entire circumference of all the tubing embedded in the concrete slab by reason of the encasement of these tubes in the concrete slab.

FIG. 4 illustrates in perspective and partially diagrammatic view the technique by which the shields 130 and 132 may be mounted in spaced relation on one side of the concrete slab. Thus, for example, shields 130 and 132 may be fused, bonded or sealed to the outer flanges of a U-shaped channel 140 made for example of aluminum or the like. The shields 130 and 132 may, as noted in part above, be fabricated of glass or of a transparent or translucent plastic capable of admitting solar heat therethrough to the concrete slab.

As noted above, the concrete slab will be preferably provided with a roughened surface. The roughened surface may be provided by roughly grooving or stroking the surface prior to the setting of the concrete. The concrete itself may be standard and, for example, there may be employed the conventional ratio of two parts of sand and gravel to one part of concrete.

Panels of the above-noted type may be, for example, five and one-half feet high and thirty inches wide. The panels will weigh approximately seventy to ninety pounds and the pump employed in association therewith may be, for example, a one-fourth horsepower pump capable of pumping fifteen gallons per minute through a thirty-eight foot rise thereby providing a throughflow in a panel of the invention of approximately three to four and one-half gallons per minute per panel. Larger or smaller pumps can be employed when necessary.

FIG. 5 illustrates a further panel of the invention which is a panel that does not necessarily employ a concrete. In FIG. 5 appears a header tube 150, a return tube 152 and a plurality of tubes 154 and 155 connected respectively thereto. These tubes 154 are connected or attached to a hollow envelope 157 constituted by corrugated steel sheets 156 and 158 or the like capable of absorbing heat from the sun and transferring heat to fluid passing through the envelope and transferring heat to fluid passing through the envelope.

In the aforesaid arrangement, while the preferred material for the corrugated sheets 156 and 158 has been indicated as being steel, alternatively, copper may be employed. In this arrangement all of the tubing (i.e., the header, riser and return tubing) is preferably of steel or copper with the header and return tubing being substantially larger than the riser tubing as concerns diameter.

The arrangement in FIG. 5 can be modified so that envelope 157 is constituted by a plurality of separate parallel flattened tubular sections. FIG. 6 illustrates that header and return tubes can be connected to envelope 157 by risers 159 coming in through one of the faces of the envelope.

In the arrangement of FIGS. 5 and 6, the steel or copper constituting the corrugated sheets is preferably provided with a black dull finish administered by painting the same. This combination provides an efficient heat absorber. In addition, the corrugation of the panels serve as a directional surface because of the angles, valleys and peaks provided by the corrugation. The panel is designed to supply a more direct exposure to the sun because of the angular corrugations.

Tests conducted with the panel of FIG. 2 indicate a recovery of 160 B.T.U.'s and higher per square foot per hour, this being substantially greater than the amount of heat recovered in other solar panel systems currently available. In fact, the amount of heat recovered per square foot per unit time represents a substantial advance in the art.

From what has been stated hereinabove, it will now be seen that the invention affords a solar heating apparatus comprising a source of heatable fluid, solar heating means to receive heat from the sun and heat said fluid therewith, heat sink means constituted, for example, by the aforesaid tank 14 and associated elements to receive fluid from the solar heating means and to store heat received with said fluid and heat transfer means to transfer means from said heat sink means to a heating system medium.

It will also be seen that the solar heating means comprises at least one solar heating panel, each such solar heating panel comprising an array of tubes of a heat conductive material which is substantially inert to the fluid passing therethrough, and a heatable mass in which said array is located and heated to heat said fluid flowing through the tubes.

It will also be seen that the heat sink includes means to connect the tank in a closed loop with the solar heating means to receive a heated fluid from the latter, said tank communicating with said heat transfer means to permit an escape of heat to the latter, there being employed an aggregate in the tank to store heat received via the heatable fluid.

It will also be seen that the heat transfer means perferably includes a duct for the passage of air or the like and means such as rocks in the duct for storing heat received from the tank.

The solar tank is fitted with a discharge line 28 and return line 29, which are used to circulate heated fluid through the existing hydronic system.

Regarding the corrugated envelope referred to hereinabove, it is possible, for example, to employ .018–26 gauge, 304 type 1818 stainess steel. The gauge can be changed depending on structural requirements and it is provided herein only by way of suggestion and not by way of limitation relative to the invention.

The rate of air circulation through the duct 24 above the tank 14 is determined by the size of the stones 30 and the speed of a circulation fan (not shown) associated therewith. The rate of circulation can vary in relation to the size of the associated system and the length of ducts throughout the construction to be heated.

By way of example, $\frac{1}{4}$ inch outside diameter copper tubing can be employed within block 116 in the embodiment illustrated in FIG. 2. The size of header 100 and return tube 102 can vary widely and, for example, three-fourths or one inch inside diameter tubing has been employed. All of these dimensions are suggestive only and are not limiting of the invention.

The corrugated panel illustrated in FIG. 5 may be enclosed in a housing which is covered with either single or double glass arrangement to act as a heat trap. Alternatively, the corrugated panel can be used without an enclosure if it is coated with a clear plastic skin which may be fused to the surface of the metal. Such skin would also act as a heat trap. By way of example, there may be employed clear high temperature acrylic or Teflon which can be sprayed over the blackened surface of the corrugated panel.

There will now be obvious to those skilled in the art many modifications and variations of the structures and techniques set forth hereinabove. These modifications and variations will not depart from the scope of the invention if defined by the following claims.

What is claimed is:

1. Solar heating apparatus comprising a source of a heatable fluid, solar heating means to receive heat from the sun and heat said fluid therewith, heat sink means to receive the fluid from said solar heating means and to store heat received with said fluid, and heat transfer means to transfer heat from said heat sink means to a heating system medium; said solar heating means comprising at least one solar heating panel; each said solar heating panel comprising an array of tubes of a heat conductive material which is substantially inert to said fluid, and a heatable mass to which said array is coupled and by which said array is heated to heat said fluid flowing through said tubes; said heatable mass including a dark colored concrete and sheets of screening embedded with said array of tubes in said mass, said sheets sandwiching said tubes therebetween, said sheets of screening being of a heat conductive material conducting heat from said concrete to said tubes and thus to said heatable fluid.

2. Solar heating apparatus as claimed in claim 1 wherein said heat sink includes a tank, means to connect the tank in a closed loop with said solar heating means to receive said heatable fluid from the latter, said tank communicating with said heat transfer means to permit the escape of heat into the latter, and aggregate in said tank to store heat received via said heatable fluid.

3. Solar heating apparatus as claimed in claim 2 wherein said heat transfer means includes a duct for the passage of air, and rocks in said duct for storing heat received from said tank.

4. Solar heating apparatus as claimed in claim 3 comprising expanded shale aggregate externally surrounding said tank, said shale being provided with dead air cells and having an external dimension of about three-quarters to one and one-quarter inches.

5. Solar heating apparatus as claimed in claim 2 wherein said aggregate is of generally increasing size from the bottom to the top of said tank, said aggregate being about one and one-half to three inches and being oversize gravel.

6. Solar heating apparatus comprising a source of a heatable fluid, solar heating means to receive heat from the sun and heat said fluid therewith, heat sink means to receive the fluid from said solar heating means and to store heat received with said fluid, and heat transfer means to transfer heat from said heat sink means to a heating system medium; said solar heating means comprising at least one solar heating panel; each said solar heating panel comprising an array of tubes of a heat conductive material which is substantially inert to said fluid, a heatable mass to which said array is coupled to heat said fluid flowing through said tubes; said mass including a corrugated metal envelope to which said tubes are coupled as parallel input tubes and parallel output tubes, said envelope forming a channel through which said heatable fluid flows and a clear plastic coating on said envelope to act as a heat trap; said heat sink including a tank, means to connect the tank in a closed loop with said solar heating means to receive said heatable fluid from the latter, said tank communicating with said heat transfer means to permit the escape of heat into the latter, and aggregate in said tank to store heat received via said heatable fluid.

7. Solar heating apparatus as claimed in claim 6 wherein said enevelope has a black surface on which said coating is superimposed.

8. Solar heating apparatus as claimed in claim 6 wherein said heat transfer means includes a duct for the passage of air, and rocks in said duct for storing heat received from said tank.

9. Solar heating apparatus as claimed in claim 8 comprising expanded shale aggregate externally surrounding said tank, said shale being provided with dead air cells and having an external dimension of about three-quarters to one and one-quarter inches.

10. Solar heating apparatus as claimed in claim 6 wherein said aggregate is of generally increasing size from the bottom to the top of said tank, said aggregate being about one and one-half to three inches and being oversize gravel.

11. Solar heating apparatus as claimed in claim 6 wherein each said solar panel includes header and return tubing from which said tubes extend, said tubes extending into said envelope to constitute a solids trap.

* * * * *

UNITED STATES PATENT AND TRADEMARK OFFICE
CERTIFICATE OF CORRECTION

PATENT NO. : 4,037,583
DATED : July 26, 1977
INVENTOR(S) : Paul Bakun and Clifford Porter It is certified that error appears in the above-identified patent and that said Letters Patent are hereby corrected as shown below:

Column 4    line 49    Change "slight" to --sight--

Column 7    line 40    Change "concrete" to --cement--

Column 8    line 47    Change "perfer" to --prefer--

Signed and Sealed this

Twenty-ninth Day of November 1977

[SEAL]

Attest:

RUTH C. MASON
Attesting Officer

LUTRELLE F. PARKER
Acting Commissioner of Patents and Trademarks